March 7, 1967 J. E. THORNTON 3,308,283

HIGH SPEED MULTIPLICATION DEVICE

Filed June 4, 1963 5 Sheets-Sheet 1

INVENTOR
JAMES E. THORNTON

BY Cushman, Darby & Cushman
ATTORNEYS

HIGH SPEED MULTIPLICATION DEVICE

Filed June 4, 1963 5 Sheets-Sheet 2

INVENTOR
JAMES E. THORNTON
BY Cushman, Darby & Cushman
ATTORNEYS

INVENTOR
JAMES E. THORNTON

BY Cushman, Darby & Cushman
ATTORNEYS

March 7, 1967 J. E. THORNTON 3,308,283

HIGH SPEED MULTIPLICATION DEVICE

Filed June 4, 1963 5 Sheets-Sheet 4

INVENTOR
JAMES E. THORNTON

BY Cushman, Darby & Cushman
ATTORNEYS

INVENTOR
JAMES E. THORNTON

BY Cushman, Darby & Cushman
ATTORNEYS

United States Patent Office 3,308,283
Patented Mar. 7, 1967

3,308,283
HIGH SPEED MULTIPLICATION DEVICE

James E. Thornton, Chippewa Falls, Wis., assignor to Control Data Corporation, Minneapolis, Minn., a corporation of Minnesota Filed June 4, 1963, Ser. No. 285,490
6 Claims. (Cl. 235—164)

This invention relates to a high speed multiplication device and more particularly to a multiplying arrangement by which a high speed calculation is carried out in a digital computer.

Speed and the amount of hardware employed are the two major variable in designing a multiplier. In the past, several multiplication techniques have been employed in data processing machines and each of these has suffered disadvantages due to the length of time required to complete a multiplication or resulting from the burden of a large amount of hardware necessary to achieve a shortcut in the multiplication process.

An example of the first type of commonly employed multiplication arrangement utilizes an iterative process of adding and shifting as the multiplicand is multiplied by each bit of the multiplier. Accordingly, when large numbers are being multiplied, the amount of time necessary for the multiplication to be completed is objectionably long since it is dependent on the sum of times required for each addition and shift step. The approximate expression of time is:

$$t=mA+nS$$

where:

$m$=number of logical "1's" in the multiplier
$n$=number of bits in the multiplier
$A$=addition time
$S$=shift time Whenever the multiplier bit under attention is zero, this expression of time assumes that the add time is avoided. Thus, only the time for shifting is taken into consideration.

Another type of multiplication device employed is one utilizing a plurality of accumulators in order to decrease the amount of time necessary to perform the multiplication by performing a plurality of addition steps simultaneously. In such an arrangement, the final product is formed by first loading the multiplicand into a plurality of accumulators, the number of accumulators set being equal to the logical "1's" in the multiplier, then pairing and adding the information in the accumulators to obtain partial answers, and finally pairing and adding these partial answers until the product is formed. In such equipment, appropriate shifting is built into the arrangement and occurs between each pairing. An approximate expression of time for this type of device is:

$$t=A \log_2 n$$

where:

$A$=addition time
$n$=number of bits in the multiplier

However, a disproportionate amount of hardware is required to achieve the time saving which this method affords.

It is an object of this invention to provide an improved multiplication arrangement in which the time required to perform the multiplication is appreciably diminished over those systems previously known without the disadvantage of a large increase in hardware to accomplish this faster multiplication.

It is another object to perform simultaneous iterative operations in order to achieve the final product in a minimum of time.

A further object is to decrease the number of addition and shifting steps required to produce a final product.

These and other objects of the invention will become more fully apparent when considered in light of the following detailed description of an illustrative embodiment of this invention and from the appended claims.

The illustrative embodiment may best be understood by reference to the accompanying drawings wherein.

Figure 1:
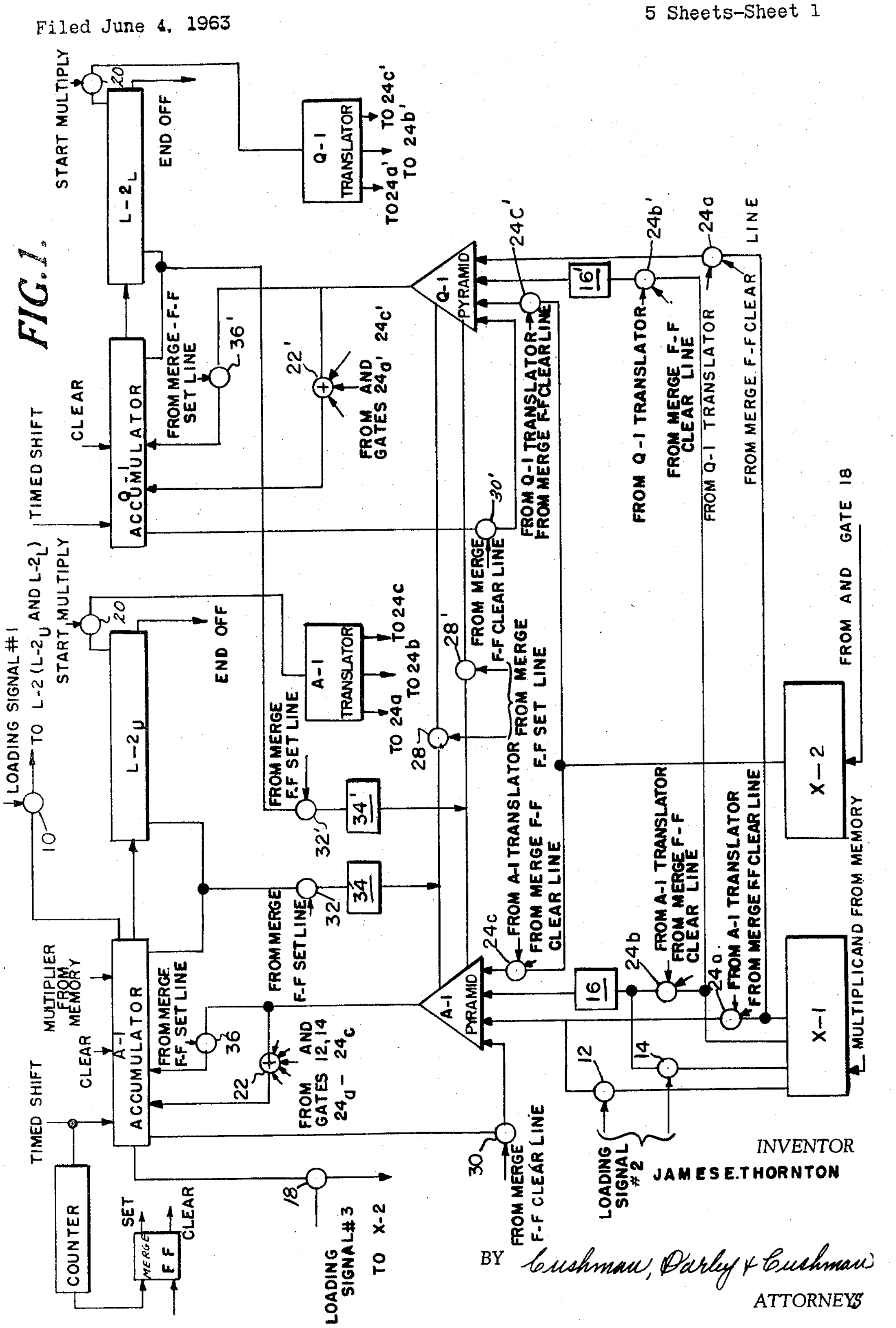
FIGURE 1 is a block diagram illustrating one complete embodiment of the invention.

Briefly, the invention comprises an arrangement wherein multiples of the multiplicand are loaded into a first register means, and the multiplier is loaded into a second register. Operatively associated with separate segments of the second register are translators which sense portions of the multiplier located in the respective segments to detect the binary value thereof thereby controlling the introduction of corresponding multiples of the multiplicand into adding pyramids associated with each translator. To each of the adding pyramids there is also connected an accumulator for storing information received from the pyramid. Information from each of the accumulators is directed to the respective pyramid to be combined with the multiples of the multiplicand introduced therein to produce partial products. These partial products are appropriately directed to the accumulators to replace the information therein. Appropriate shifting operations are provided and iterative additions, controlled by the remaining bits of multiplier in each second register segment, are performed in the same manner just described to produce resultant partial products which are merged to obtain a final product.

Before entering into a discussion of the precise arrangement of the invention for accomplishing the improved multiplication techniques, a review of heretofore known techniques will be conducted and a comparison will be made with the multiplication process accomplished by the apparatus of the invention. To simplify the explanation, it will be assumed that there is an add step to create each partial product although it will be appreciated that in actual operation, the multiplication of a multiplicand by a "0" bit in the multiplier results simply in a shift operation rather than an add-shift as shown. However, in spite of this liberty, it will still be apparent that the multiplication technique of the invention affords a higher speed multiplication than the other arrangements.

A binary multiplication done by hand will first be considered. The binary values which will be multiplied are a 11101 multiplicand and a 10011 multiplier. In conducting this multiplication by hand, the sequence employed is demonstrated as:

```
    11101  Multiplicand
    10001  Multiplier
    -----
    11101
   11101
  00000
 00000
11101
---------
100100111  Final product
```

In the basic computer, the multiplication just described is accomplished by an add-shift process which is shown as follows:

```
11101  Multiplicand
10011  Multiplier
-----
11101  Partial product #1

Shifting the multiplier and the partial product #1
11101
 10011
-----
 11101
11101
-------
1010111  Partial product #2

Shifting the multiplier and the partial product #2
11101
  10011
-------
1010111
00000
-------
1010111  Partial product #3

Shifting the multiplier and the partial product #3
11101
   10011
--------
 1010111
00000
--------
01010111  Partial product #4

Shifting the multiplier and the partial product #4
11101
    10011
----------
 001010111
11101
----------
1000100111  Final product
```

As can be seen, this operation has required nine separate steps, five adds and four shifts, in order to achieve the final product.

The effective number of steps may be decreased by providing a modified arrangement with simultaneous operations on the multiplicand by separate portions of the multiplier. In this case, the multiplier is divided into half, one portion, the most significant half, being 010 and the remainder, the least significant half, being 011. In this arrangement, the same basic operation as in the serial computer is employed in order to produce two separate partial products which are combined in a final add step to achieve a final product. This operation is shown as follows:

```
11101                               11101
  010                                 011
-----                               -----
00000  Partial product #1a          11101  Partial product #1b

Shifting the multiplier halves and the partial products #1a and #1b
11101                               11101
   010                                 011
------                              ------
 00000                               11101
11101                               11101
------                              -------
111010  Partial product #2a         1010111  Partial product #2b

Shifting the multiplier halves and the partial products #2a and #2b
11101                               11101
    010                                 011
-------                             -------
 111010                             1010111
00000                               00000
-------                             -------
0111010  Partial product #3a        1010111  Partial product #3b

Combining partial products #3a and #3b
    1010111
   0111010
 ----------
 1000100111
```

In this multiplication operation a total of twelve steps has been required, seven adds and five shifts. However, since there has been simultaneous addition and shifting to obtain partial products #3*a* and #3*b*, the time for the ten steps required to produce these partial products is equivalent to the time necessary for five steps to be accomplished by the straight add-shift process. Therefore, the over-all effective sequence to produce the final product has been reduced to the time required for seven steps. It should be here noted that an important element in producing the final product by combining partial products 3*a* and 3*b* is the appropriate displacement of one with respect to the other since the simultaneous operations on the multiplicand were performed by bits of the multiplier of different significance.

In the arrangement of the invention, an improved multiplication technique is provided by simultaneously operating on the multiplicand and multiples thereof by dividing the multiplier into segments and utilizing a plurality of multiplier bits of each segment to obtain each partial product. In the example illustrated, two multiplier bits at a time, these bits being of increasing significance within each segment, are employed rather than the single bit in the previous illustration. This arrangement can be shown as follows:

```
                        1×multiplicand    11101
                        2×multiplicand   111010
                        3×multiplicand  1010111

11101                                     11101
  010                                       011
  └──(binary 2)                             └──(binary 3)
------                                   -------
111010  Partial product #1c is           1010111  Partial product #1d is
        multiple of multiplicand                  multiple of multipli-
        corresponding to binary                   cand corresponding to
        value of multiplier bits                  binary value of multi-
        employed                                  plier bits employed

Shifting the multiplier halves and partial products #1c and #1d two places
                              to right

11101                                    11101
  010                                      011
  └──(binary 0)                            └──(binary 0)
 111010                                  1010111
00000                                    00000
-------                                  -------
0111010  Partial product #2c is          1010111  Partial product #2d is
         sum of partial product                   sum of partial product
         #1c shifted two places                   #2c shifted two places
         to right plus multiple                   to right plus multiple
         of multiplicand corre-                   of multiplicand corre-
         sponding to binary                       sponding to binary
         value of multiplier                      value of multiplier
         bits employed                            bits employed

                    Combining partial products
                           #2c and #2d
                              1010111
                            0111010
                          ----------
                          1000100111
```

Utilizing the technique just described a total of eight steps has been required to complete the multiplication. These include five adds and three shifts. However, since simultaneous addition and shifting has been employed to obtain partial products #2*c* and #2*d*, the time required to complete the multiplication is equivalent to the time required to accomplish five steps in the straight add-shift manner.

An approximate mathematical expression for the time required to complete an actual multiplication utilizing this technique applied by the invention is:

$$t=A\left(2^{q-1}-1+\log_2 a+\frac{n}{aq}\right)+nS$$

where:

$A$=addition time
$S$=shift time
$q$=number of multiplier bits taken at once
$a$=number of accumulators
$n$=number of bits in the multiplier Now that the multiplication technique has broadly been discussed, an illustrative embodiment of a multiplication device utilizing this technique will be set forth. In FIGURE 1, there is disclosed an arrangement which illustrates, in block diagram form, an interrelationship of apparatus for performing the desired multiplication operation. This arrangement comprises a first register means, including a register X–1 for storing a multiplicand introduced thereto from the computer memory and a register X–2 which stores the third multiple of the multiplicand generated by the multiplication device itself during the loading cycle in a manner to be described fully with reference to FIGURE 2. For purposes of illustration, the computer will be considered as handling 48 bit word lengths, these 48 bits comprising a sign bit, not processed within the multiplication portion of the computer, and 47 information bits. For convenience, the X–1 register is considered capable of holding 48 bits. The X–2 register requires a 49 bit capacity to hold the third multiple of the 47 bit word. Register X–1 is connected through an AND gate 24*a* as an input to an A–1 Pyramid. The output of X–1 is also directed through a second AND gate 24*a′* as an input to a second pyramid, this being called the Q–1 Pyramid. The output of X–1 is connected through an AND gate 24*b* and an element 16 as a second input to the A–1 Pyramid and through AND gate 24*b′* and element 16′ as a second input to the Q–1 Pyramid. The output of X–1 is also connected through an AND gate 12 and through AND gate 14 and element 16 as additional separate inputs to the A–1 Pyramid. The purpose of this latter arrangement, which is effectively a parallel circuitry arrangement across AND gates 24*a* and 24*b* respectively, is to provide one path arrangement to the A–1 Pyramid for loading purposes and another for use during multiplication. The output of register X–2 is connected through AND gates 24*c* and 24*c′* as an additional input to the A–1 Pyramid and the Q–1 Pyramid, respectively. The A–1 and Q–1 Pyramids are identical, both being adding pyramids which include a double level feed register arrangement by which two binary numbers may be entered into the feed registers of each pyramid to be added, the output of the pyramid being the summation, which in the case of a multiplication process, is first a partial product and eventually a final product. An example of a type of pyramid which may be employed is fully described in the copending application Serial No. 285,514, filed June 4, 1963, of Ronald G. Hintz, entitled "Borrow Pyramid Having Simultaneous Borrow Generation and Normalize System," now Patent 3,293,422. The feed registers of the pyramids of the present embodiment will each be assumed to be capable of storing a 48 bit word. Accordingly when greater lengths of information must be stored for an addition operation, an arrangement is necessary to butt the feed registers of one of the pyramids with the feed registers of the adjacent pyramid. Such connections between the A–1 and Q–1 Pyramids are indicated for convenience in the block diagram of FIGURE 1 by separate paths extending between the pyramids passing through AND gates 28 and 28′ respectively to indicate that the two final partial products are separately applied to butted feed registers.

As stated previously, the output of each pypramid during the multiplication process is a partial product. In order to perform an iterative cycle, it is necessary that the partial products be stored in accumulation devices. Therefore, the output of the A–1 Pyramid is connected to an A–1 Accumulator by either of two paths, one through an OR gate 22 and the second through an AND gate 36. The need for two paths to the accumulator will hereinafter be described in detail. Similarly, the output of the Q–1 Pyramid is connected through OR gate 22′ and AND gate 36′ as separate inputs to a Q–1 Accumulator. Since computer word lengths of 48 bits are utilized in the illustrative embodiments, the accumulators will be considered as being 49 bits in length. The information stored in the accumulators is directed as an additional input to the feed registers of their respective pyramids through AND gates 30 and 30′. The A–1 Accumulator is connected through an AND gate 18 to the input of the X–2 register to be used to load this register in the manner to be described with reference to FIGURE 2. The A–1 Accumulator is also physically connected to the L–$2_U$ segment of an L–2 register in order that information may be shifted from the A–1 Accumulator to this segment as will be set forth in the description of the operation of the multiplying process set forth with reference to FIGURE 3. Similarly, the Q–1 Accumulator is butted with the L–$2_L$ segment of the L–2 register. The output of the A–1 Accumulator is also connected through an AND gate 10 to the entire L–2 register in order that L–2 will be loaded with the multiplier prior to multiplication. Since the multiplier may be 47 bits long, the L–2 register must be at least equal to this length. For convenience, segments L–$2_U$ and L–$2_L$ each have 24 bit positions. The L–$2_U$ segment of the L–2 register is connected through AND gate 20 and an A–1 Translator to the AND gates 24*a–c*. This A–1 Translator during the multiplication operation senses the two least significant bits present in the L–$2_U$ segment to selectively condition one of the AND gates 24*a–c* when the binary value of the sensed bits is greater than zero. In this illustrative arrangement, only the two least significant bits of the portion of the multiplier in the L–$2_U$ segment are sensed, but it will be understood that other arrangements comprising an expansion on the basic technique employed in the illustrative embodiment may be fabricated by which greater portion of the multiplier may be sensed. To the output of the L–$2_L$ segment of the L–2 register, there is connected a Q–1 Translator, identical with the previously described translator, which provides inputs to the AND gates 24*a′–c′*. The Q–1 Translator serves to pass multiples of the multiplicand to the Q–1 Pyramid. By a process to be hereinafter described in detail, the multiplication technique utilized by this apparatus produces a pair of partial products which are combined to form a final product. The first partial product is partially contained in the L–$2_U$ segment of the L–2 register and in the A–1 Accumulator. The second partial product is similarly stored in the L–$2_L$ segment and Q–1 Accumulator. In order to insure that the whole of each of the two final partial products are introduced to the pyramids when the final product is fabricated by the merging operation, the outputs of the A–1 Accumulator and L–$2_U$ segments are shown connected through an AND gate 32 and an element 34 to one of the lines interconnecting the feed registers of the pyramids, whereas the Q–1 Accumlator and the L–$2_L$ segment of the L–2 register are connected through an AND gate 32′ and element 34′ to the second line interconnecting the feed registers of the pyramids. The apparatus also comprises a Counter connected to a timed shift input to the accumulators, the output of the Counter being connected as an input to a Merge Flip-Flop. The CLEAR output line of the Merge Flip-Flop is connected to AND gates 24*a–c*, 24*a′*–$_2$′, 30 and 30′. The SET output line of the Merge Flip-Flop is connected to the input lines of AND gates 28, 28′ and 32, 32′, 36 and 36′. The inputs to OR gate 22 are from AND gates 12, 14 and 24*a–c*. The inputs to OR gate 22′ are connected from the outputs of AND gates 24*a′–c′*. To AND gates 10, 12, 14 and 18, separate loading signals are applied as will be described with reference to FIGURE 2. The accumulators and the Merge Flip-Flop are also provided with appropriate input lines for CLEAR pulses, and AND gates 20 and 20′ are provided with inputs constituting a multiplication start signal. The segments of the L–2 register are provided with LND OFF arrangements so that the least significant bits sensed by the corresponding translators may be ENDED OFF after translation.

All of the particular elements of circuitry embodied in the complete multiplication device just described are conventional circuitry arrangements with the exception of the A–1 and Q–1 Pyramids. An example of a translator suitable for use in this system is shown with reference to FIGURE 4. The accumulators and registers are typical storage devices which may, for example, be composed of a number of interconnected flip-flops, or bi-stable multivibrators. The elements 16, 16', 34 and 34' are simply electrical connections which physically displace a quantity in the feed registers in the pyramids with respect to the same quantity entered into the pyramid feed registers. In the case of elements 16 and 16', this is a shifting of the multiplicand one bit position to the left in order to create a second multiple of the multiplicand. In the case of elements 34 and 34', the purpose is to correctly displace one final partial product with respect to the second final partial product by appropriate significance dictated by the length of the multiplier in each segment of L–2 register in order to achieve a correct final product.

Figure 2:
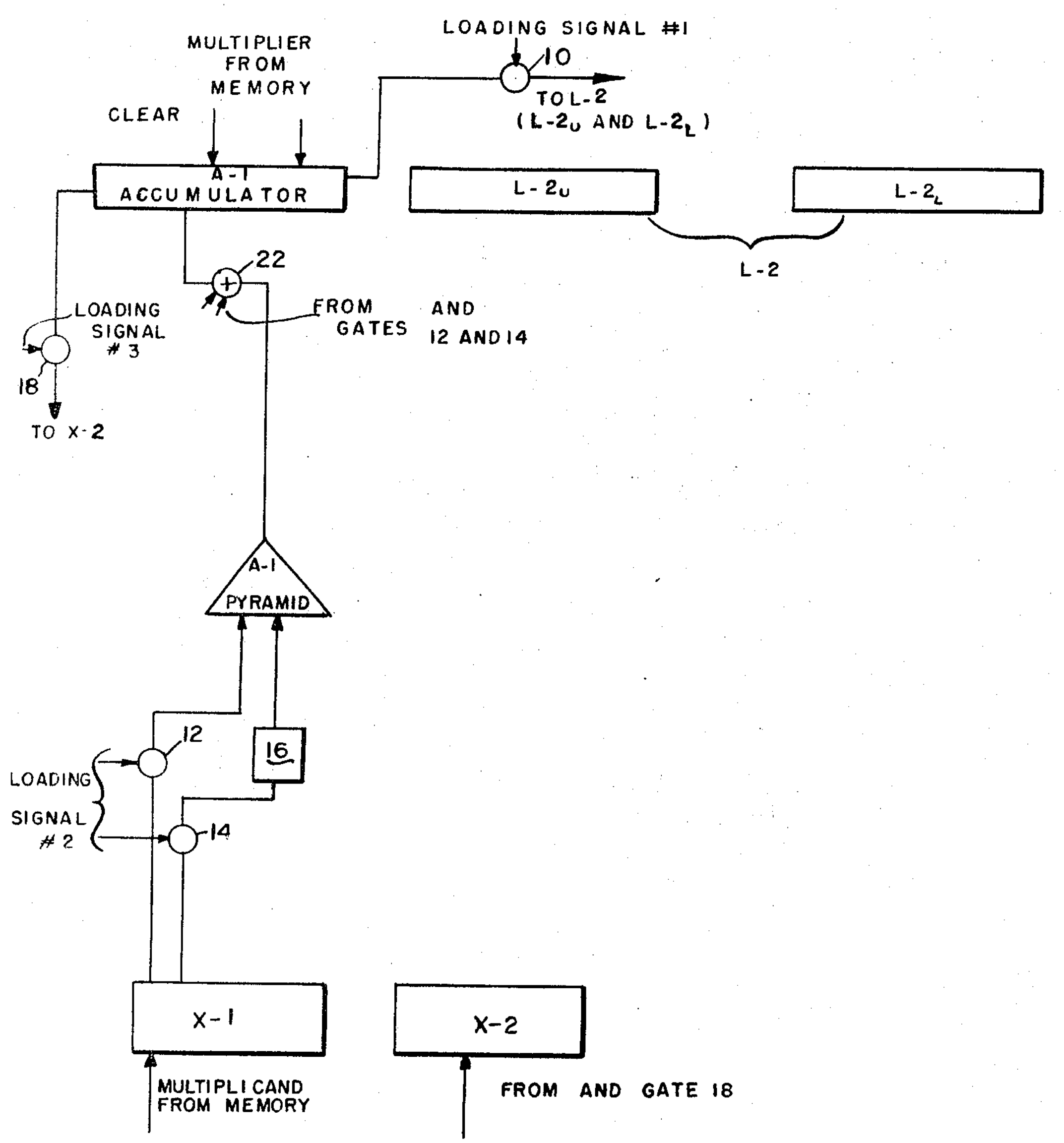
FIGURE 2 is a block diagram of a portion of the arrangement of FIGURE 1 illustrating those portions utilized in preparing the multiplying arrangement for a multiplication operation.

The operation of the multiplication apparatus of FIGURE 1 may best be described with reference to the separate portions thereof as shown in FIGURES 2 through 5. In initially preparing the multiplying device for the multiplication operation, the arrangement illustrated in FIGURE 2 is employed. It will be assumed initially that all of the registers of the multiplying arrangement are CLEARED. In preparing the system for the computation, the multiplier is first entered from memory into the A–1 Accumulator and the multiplicand is entered from memory into the X–1 register. A first loading signal is then applied to AND gate 10 to gate the multiplier from the A–1 Accumulator to register L–2. As stated previously, register L–2 is a single storage device which is divided into segments $L\text{–}2_U$ and $L\text{–}2_L$ for purposes to be described hereinafter. The A–1 Accumulator is then CLEARED by a signal on the CLEAR input line thereto. A second loading signal is then applied simultaneously to AND gates 12 and 14 to apply the multiplicand and the second multiple of the multiplicand to the feed registers of the A–1 Pyramid, the second multiple being achieved by element 16 displacing the multiplicand one bit position to the left in the feed registers with respect to the multiplicand introduced thereto by enabling gate 12. The A–1 Pyramid combines the multiplicand and the second multiple thereof to load the CLEARED A–1 Accumulator with the summation of these multiples, which necessarily is the third multiple of the multiplicand. A third loading signal is then applied to AND gate 18 to gate the third multiple from the A–1 Accumulator in order to load the X–2 register. The A–1 Accumulator is then CLEARED and the system is ready for the multiplication operation.

As has been stated previously, the L–2 register is divided into equal segments, one being operatively connected with the A–1 Accumulator and storing the more significant half of the multiplier, and the other segment, holding the less significant half of the multiplier, being operatively associated with the Q–1 Accumulator. These two segments have respectively been designated $L\text{–}2_U$ and $L\text{–}2_L$, and their function will now be described in detail with reference to FIGURE 3. When it is desired to commence a multiplication cycle, a signal is applied to AND gates 20 and 20' after the multiplication device is loaded to allow the A–1 Translator and the Q–1 Translator to begin operation. Since both halves of the system operate identically, only the portion associated with the A–1 Pyramid will be described. The A–1 Translator senses the two multiplier bits of lowest significance in the $L\text{–}2_U$ register to control the introduction of multiples of the multiplicand to the A–1 Pyramid. The precise manner by which this is accomplished will hereinafter be described with relation to FIGURE 4. However, for present purposes, it is sufficient to state that the sensing of a binary value of one gates a corresponding unitary multiple of the multiplicand to the A–1 Pyramid via AND gate 24a. Similarly, sensing of a binary value of two or three by the A–1 Translator gates the second or third multiples of the multiplicand to the A–1 Pyramid through AND gates 24b or 24c respectively. After the two least significant bits of the $L\text{–}2_U$ register are sensed, a shift pulse is applied to the A–1 Accumulator to shift the information therein two bit positions to the right. Since the $L\text{–}2_U$ register is arranged in abutting relationship with the A–1 Accumulator, the two lowest order bits of the A–1 Accumulator are shifted to the two highest order positions of the $L\text{–}2_U$ register and the two lowest order bits of the multiplier which have been sensed are shifted out of the $L\text{–}2_U$ register in an END OFF operation. The A–1 Pyramid then combines the information remaining in the A–1 Accumulator with the multiple of the multiplicand which has been introduced by the translator into the A–1 Pyramid. This adding pyramid sums this information and directs the result to the A–1 Accumulator through OR gate 22. This OR gate is conditioned by an output appearing on any AND gate 24a–c. If the binary value of the two bits sensed were zero, no output would be directed from the A–1 Pyramid to the A–1 Accumulator. With the new multiplier bits in the lowest order positions of the $L\text{–}2_U$ register, the above operation is continued. Thus, an iterative addition is achieved and more and more partial product information is shifted into the $L\text{–}2_U$ register in each cycle. The time shift input is connected to a Counter which counts the number of cycles which are completed. Assuming that there are 47 multiplier bits divided between the $L\text{–}2_U$ and $L\text{–}2_L$ segments of the L–2 register, the entire multiplication sequence is completed in twelve cycles since two multiplier bits at a time are sensed by the A–1 Translator. On completion of the twelfth cycle, the Counter is utilized to merge the final two partial products in a manner to be described hereinafter with reference to FIGURE 5.

Figure 4:
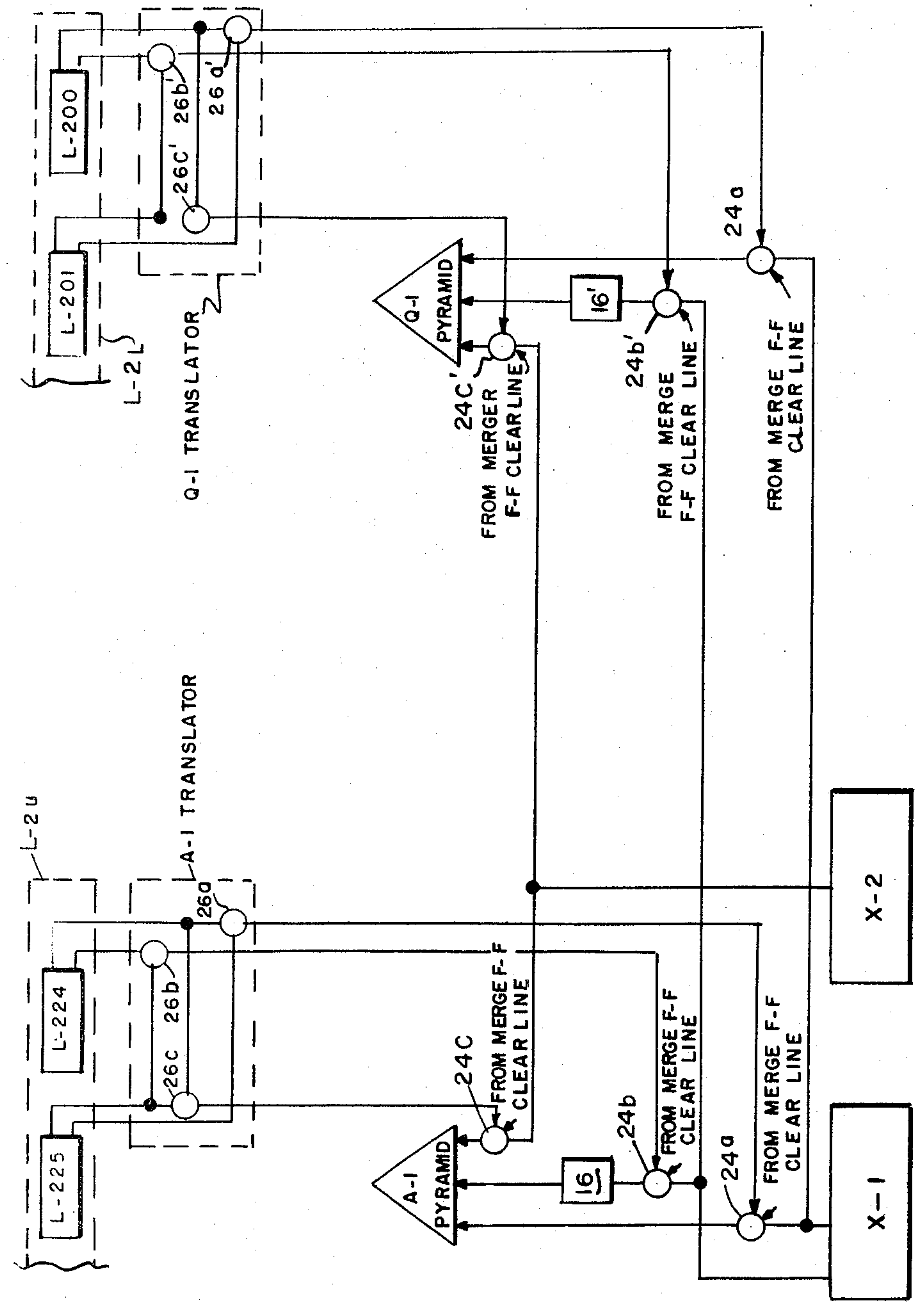
FIGURE 4 is a block diagram of a translator arrangement which may be employed in the arrangement shown in FIGURES 1 and 3 to perform the multiplying operation.
Figure 5:
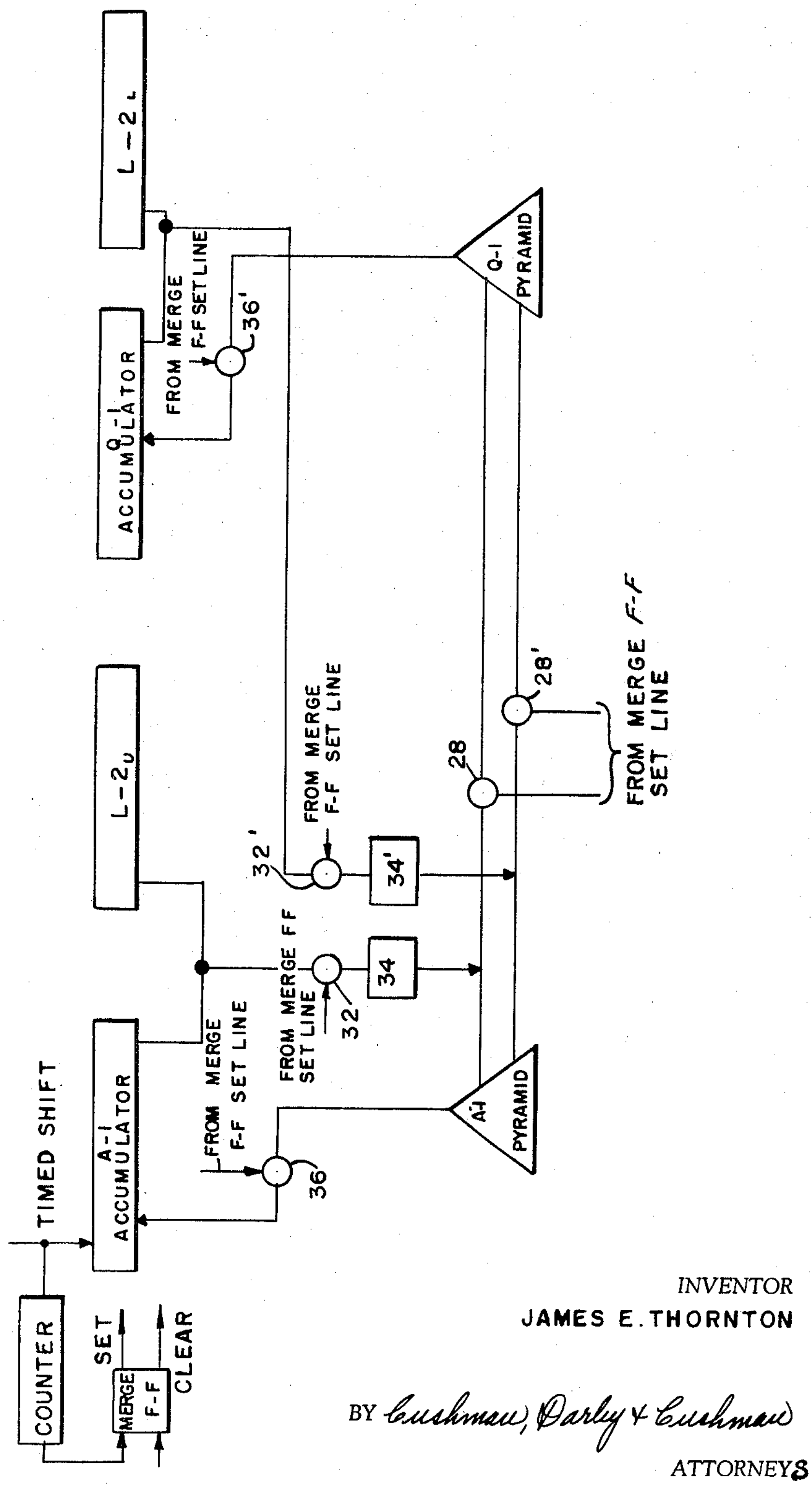
FIGURE 5 is a block diagram of an illustrative arrangement for merging the final partial products produced in the multiplying operation in order to achieve a final product.

An example of a translator which may be employed to sense the multiplier bits in the separate segments of the L–2 register is set forth in FIGURE 4. For convenience, the AND gate 20 and 20' arrangement for commencing multiplication has been omittted. As has been stated previously, the L–2 register may be comprised of a plurality of interconnected flip-flops. Assuming that the L–2 register is a 48 bit storage device, and is divided in half in employment in the system shown in FIGURE 1, the two flip-flops holding the least significant bits of the upper segment of the register are designated L–224 and L–225 and the flip-flops of least significance in the other segment of the L–2 register are, in order of least significance, flip-flops L–200 and L–201. These flip-flops of the L–2 register are interconnected, as shown, at their respective SET and CLEAR output lines through a series of AND gates 26a, 26a' . . . etc. to a plurality of AND gate 24a, 24a' . . . etc. to which the X–1 and X–2 registers are also connected as inputs. Once again, since both halves of the multiplication arrangement operate simultaneously, the translator for only one half of the system need be described. Assuming that a pair of binary "0's" are positioned in the least significant two bit positions of the upper segment of the L–2 register, the SET output lines of flip-flops L–224 and L–225 have "0's" thereon and the CLEAR output lines have "1's." Since there is no AND gate 26 to which both CLEAR output lines are connected, there will be no gating of a multiplicand from the X–1 or X–2 registers to the A–1 Pyramid. However, if a binary value of one is present, the SET output line of flip-flop L–224 will have a "1" thereon which combines with the "1" on the CLEAR output line of L–225 to condition AND gate 26a. Since during multiplication the Merge Flip-Flop is CLEARED, this results in the conditioning of AND gate 24a to pass the first multiple of the multiplicand to the A–1 Pyramid. If a binary value of two is stored in the upper segment of the L–2 register, the logical "1" on the SET output line of flip-flop L–225 cooperates with the "1" on the CLEAR output line of L–224 to condition AND gate 26b and thereby enable gate 24b. This passes a single multiple of the multiplicand to element 16 which physically displaces the single multiple of the multiplicand within the feed registers of the pyramid to form a second multiple since the binary notation of the second multiple of a number is simply the binary number itself shifted one place to the left. If a binary value of three is present in the least significant bit positions of the L–$2_U$ register, the "1" outputs on the SET output lines of L–224 and L–225 condition AND gate 26c which permits AND gate 24c to be enabled thereby gating the third multiple of the multiplicand from the X–2 register to the A–1 Pyramid.

Figure 3:
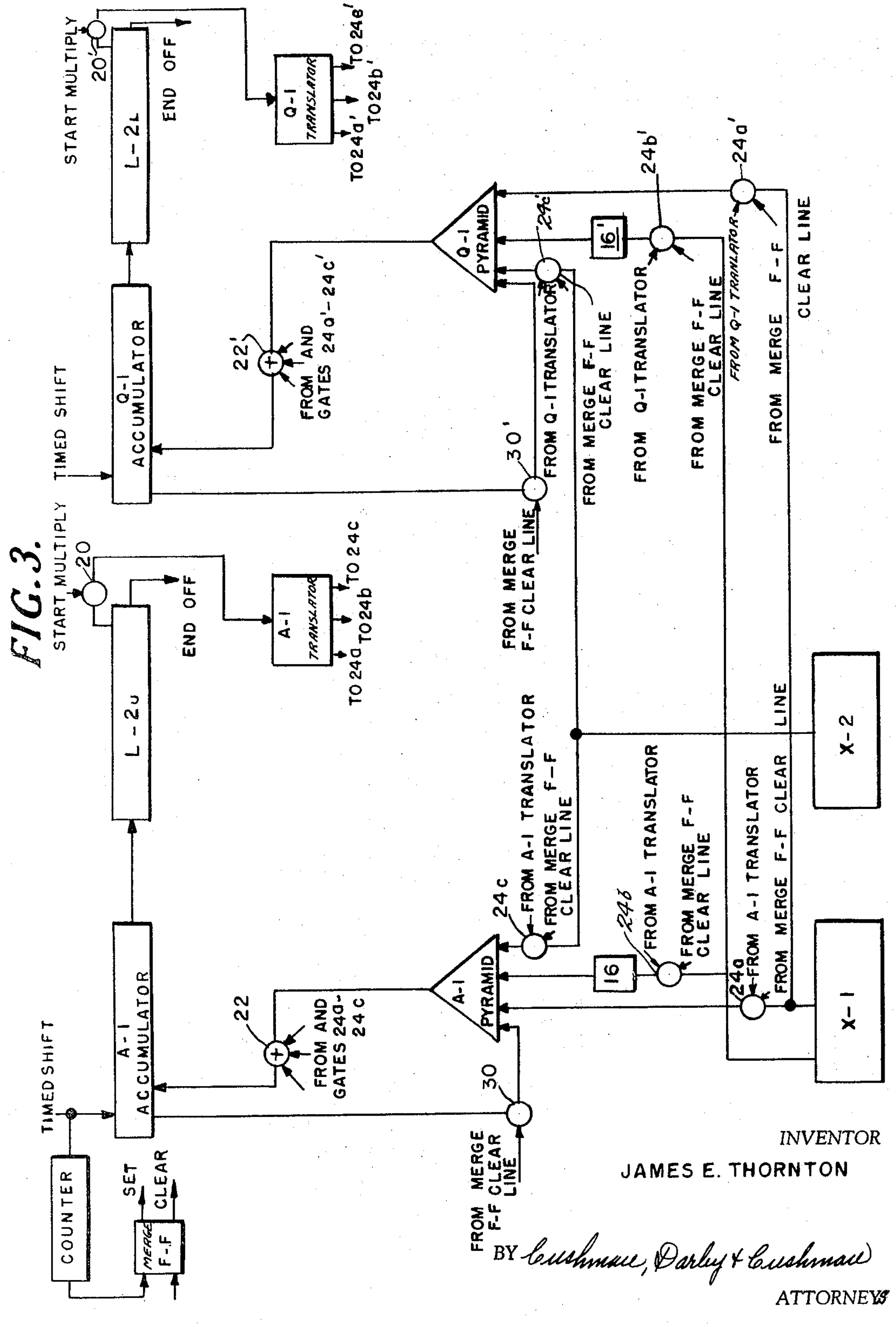
FIGURE 3 is a block diagram of those portions of FIGURE 1 utilized during the multiplying operation.

Now that the method for obtaining the final two partial products has been set forth in detail in the discussion relative to FIGURE 3, the arrangement for merging these two partial products into a final product will be described. As has been stated previously, one of the partial products is partially contained in the A–1 Accumulator and the remainder of this partial product, i.e., the lowest significant portion thereof, is positioned in the highest order positions of the L–$2_U$ register. Similarly, the other partial product is located in the Q–1 Accumulator and the L–$2_L$ register. In combining the two partial products, it is necessary that one product be displaced with respect to the other since the simultaneous multiplications were conducted on multiplier bits of different significance. Since in the example shown, a 47 bit multiplicand and multiplier have been contemplated, a final product of 94 bits length is a possibility. Therefore, in order to add the two lengthy final partial products to obtain such a final product, addition means must be provided to accommodate these final partial products. The feed registers of the A–1 and Q–1 Pyramids have been described as being capable of 48 bit storage. Therefore, in order to achieve appropriate addition of the partial products to get a final product, the feed registers are interconnected. As was described with reference to FIGURE 1, this is accomplished by providing AND gates 28 and 28' interconnecting the feed registers of the A–1 and Q–1 Pyramids. Since it is not desired that these AND gates be conditioned during the multiplication process, the gates are only conditioned after the two final partial products are obtained. Accordingly, for purposes of illustration, these gates are shown as connected to the SET output line of a Merge Flip-Flop. In the multiplication process, when the Counter reaches a prescribed count, in our example a count of twelve cycles, the Counter output SETS the Merge Flip-Flop to condition the AND gates 28 and 28' thereby interconnecting the feed registers of the pyramids. The interconnection of the pyramids is shown to be achieved by the use of a pair of paths. However, this arrangement is one of convenience of illustration merely to clearly indicate a means by which the two final partial products are applied separately to the interconnected feed registers of the pyramids. Simultaneously with the interconnection of the pyramids, the direct connection from the A–1 and Q–1 Accumulators to their respective pyramids is broken since the AND gates 30 and 30' are no longer conditioned as the output on the CLEAR line of the Merge Flip-Flop to which these gates are connected has become a logical "0." This prevents only those portions of the final partial products in the A–1 and Q–1 Accumulators from being directed to their respective pyramids. To insure that the entire partial products will be supplied to the interconnected feed registers of the pyramids, AND gates 32 and 32' are enabled by the "1" output of the SET line of the Merge Flip-Flop. This allows the full partial products to be applied to elements 34 and 34' which physically displace one partial product with respect to the other in the interconnected feed register relationship in accordance with the significance of the multiplication procedure. The pyramids then operate to produce a final product which is gated to the A–1 and Q–1 Accumulators respectively through AND gate 36 and 36', conditioned by the "1" on the SET line of the Merge Flip-Flop. Since the accumulators each may hold 49 bits, the portion of higher significance is placed in the A–1 Accumulator and the lower significance in the Q–1 Accumulator and no part of the final product appears in the L–2 register. By obvious interchange of logical arrangements, the relative positions of the significant portions of the final product may be reversed so that the high order bits are located in the Q–1 Accumulator and the lowest in the A–1 Accumulator.

In the multiplication device which has been described, an assumption has been made that the sign of the information received from the computer memory is considered by equipment external of the device which constitutes the invention. Therefore, the operation of the multiplication device disclosed is concerned with magnitudes only, and the result produced is subsequently operated upon by equipment not constituting part of the invention in order to reference the result in accordance with sign of the original information.

The invention provides a high speed multiplication device which may be utilized with fixed point or floating point numbers, and the device may be combined with additional external equipment to perform normalization and rounding operations.

The above-described embodiment is illustrative of a preferred embodiment of the invention but is not intended to limit the possibilities of insuring the features of increased speed and fewer components in obtaining a high speed multiplication operation. As an example of other modifications which may be made, the translators may sense more than two multiplier bits at a time to gate multiples of the multiplicand, corresponding to the binary value of the multiplier bits sensed, to the appropriate adding pyramids. The multiplication device disclosed herein is an example of an arrangement in which the inventive features of this disclosure may be utilized, and it will become apparent to one skilled in the art that certain modifications may be made within the spirit of the invention as defined by the appended claims.

What is claimed is:

1. A high speed multiplier for a digital computer comprising a first register means for storing multiples of of a multiplicand and a second register means for storing a multiplier, a first adding pyramid and a second adding pyramid, a first information storing accumulator associated with said first pyramid and a first segment of said second register means, a second information storing accumulator associated with said second pyramid and a second segment of said second register means, means under the control of a portion of the multiplier in said first segment of the second register means for introducing appropriate multiples of said multiplicand in the first register means into said first adding pyramid, and means under the control of a portion of the multiplier in said second segment of the second register means for simultaneously introducing appropriate multiples of said multiplicand in the first register means into said second adding pyramid; means for shifting a portion of the information in said first information storing accumulator into said first segment of said second register means and means for simultaneously shifting a portion of the information in said second information storing accumulator into said second segment of said second register means; means for adding the remaining information in said first accumulator with the multiple of said multiplicand introduced into the first pyramid to produce new information in said first accumulator, and means for simultaneously adding the remaining information in said second accumulator with the multiple of said multiplicand introduced into the second pyramid to produce new information in said second accumulator.

2. A high speed multiplier as set forth in claim 1 further comprising means for merging the new information in said first and second accumulators and the portions of information shifted into said first and second segments of the second register means to create a final product.

3. A high speed multiplier as set forth in claim 1 wherein the new information in said first accumulator and the information shifted into the first segment of said second register means comprises one partial product, and the new information in said second accumulator and the information shifted into the second segment of said second register means comprises another partial product, and means for merging said partial products into a final product.

4. A high speed multiplier as set forth in claim 3 wherein said means for merging comprises interconnected first and second adding pyramids for adding said partial products.

5. A high speed multiplier for a digital computer comprising: a first register means for storing multiples of a multiplicand and a second register means for storing a multiplier, a first adding pyramid and a second adding pyramid, a first information storing accumulator associated with said first pyramid and a first segment of said second register means, a second information storing accumulator associated with said second pyramid and a second segment of said second register means, a portion of said multiplier being stored in said first segment and a separate portion of the multiplier being stored in the second segment; means under the control of the portion of the multiplier in said first segment for introducing appropriate multiples of said multiplicand in said first register means into said first adding pyramid and means under the control of the portion of the multiplier in said second segment for simultaneously introducing appropriate multiples of said multiplicand in said first register means into said second adding pyramid; said pyramids being operative to combine information in their associated accumulators with the appropriate multiples of said multiplicands introduced therein to produce partial products which are placed as new information in the respective accumulators.

6. A high speed multiplier as set forth in claim 5 further comprising means for merging said partial products into a final product.

References Cited by the Examiner

UNITED STATES PATENTS

| | | | |
|---|---|---|---|
| 3,069,085 | 12/1962 | Cooper et al. | 235—164 |
| 3,115,574 | 12/1963 | Paul et al. | 235—164 |
| 3,192,366 | 6/1965 | Cochran et al. | 235—164 |
| 3,192,367 | 6/1965 | Oman | 235—164 |

OTHER REFERENCES

Pages 32–34, April 1962, Blaauw et al., "Binary Multiplication," IBM Technical Disclosure Bulletin, vol. 4, No. 11.

MALCOLM A. MORRISON, *Primary Examiner.*

ROBERT C. BAILEY, *Examiner.*

M. J. SPIVAK, *Assistant Examiner.*